(12) United States Patent
Agrahari (10) Patent No.: US 7,503,601 B2
(45) Date of Patent: Mar. 17, 2009

(54) B-SHAPED BEAM WITH RADIUSED FACE BUT RECESSED CENTER

(75) Inventor: Shailesh K. Agrahari, Holland, MI (US)

(73) Assignee: Shape Corp., Grand Haven, MI (US)

( * ) Notice: Subject to any disclaimer, the term of this patent is extended or adjusted under 35 U.S.C. 154(b) by 0 days.

(21) Appl. No.: 11/875,395

(22) Filed: Oct. 19, 2007

(65) Prior Publication Data

US 2008/0296919 A1 Dec. 4, 2008

Related U.S. Application Data

(60) Provisional application No. 60/941,129, filed on May 31, 2007.

(51) Int. Cl.
B60R 16/02 (2006.01)
(52) U.S. Cl. .................. 293/102; 29/897.2; 293/122
(58) Field of Classification Search ............. 293/102, 293/121, 122, 146, 120; 29/897, 29/897.2
See application file for complete search history.

(56) References Cited

U.S. PATENT DOCUMENTS

| | | | |
|---|---|---|---|
| 4,599,843 A | 7/1986 | Ingvarsson | |
| 5,080,410 A | 1/1992 | Stewart et al. | |
| 5,080,411 A | 1/1992 | Stewart et al. | |
| 5,080,427 A | 1/1992 | Sturrus et al. | |
| 5,092,512 A | 3/1992 | Sturrus et al. | |
| 5,306,058 A | 4/1994 | Sturrus et al. | |
| 5,722,708 A | 3/1998 | Jonsson | |
| 5,803,514 A | 9/1998 | Shibuya et al. | |
| 5,829,666 A | 11/1998 | Takeda et al. | |
| 5,845,948 A | 12/1998 | Anderson et al. | |
| 5,934,544 A | 8/1999 | Lee et al. | |
| 6,042,163 A | 3/2000 | Reiffer | |
| 6,179,353 B1 | 1/2001 | Heatherington et al. | |
| 6,349,521 B1 | 2/2002 | McKeon et al. | |
| 6,352,297 B1 | 3/2002 | Sundgren et al. | |
| 6,554,345 B2 | 4/2003 | Jonsson | |
| 6,591,576 B1 | 7/2003 | Iida et al. | |
| 6,591,577 B2 | 7/2003 | Goto | |
| 6,684,505 B2 | 2/2004 | Sundgren et al. | |
| 6,726,258 B1 | 4/2004 | Sundgren et al. | |
| 6,726,261 B2 | 4/2004 | Goto et al. | |
| 6,813,920 B2 * | 11/2004 | Yoshida et al. ............... 72/166 |
| 6,851,731 B2 | 2/2005 | Janssen | |
| 6,893,062 B2 | 5/2005 | Amano et al. | |
| 6,896,314 B2 | 5/2005 | Guiles | |
| 6,923,482 B2 | 8/2005 | Cumming et al. | |
| 6,948,749 B2 | 9/2005 | Graber | |
| 6,971,691 B1 | 12/2005 | Heatherington et al. | |
| 6,986,536 B1 | 1/2006 | Heatherington et al. | |

(Continued)

*Primary Examiner*—Jason S Morrow
(74) *Attorney, Agent, or Firm*—Price, Heneveld, Cooper, DeWitt & Litton LLP (57) ABSTRACT

A B-shaped tubular reinforcement beam for vehicle bumper systems has a constant B section and longitudinal sweep. The tubular beam has a vertical cross section defining at least first and second tubes connected by a center web, and a front wall that extends across the tubes and the center web to define a channel. The channel has a depth dimension (D1) to the center web of about 15-30 mm, and preferably about 20 mm depth. The first and second tubes on their channel-side portion each include a section of wall defining a radius (R1) that is between about 15-30 mm, and preferably 25 mm.

14 Claims, 9 Drawing Sheets

U.S. PATENT DOCUMENTS

| | | |
|---|---|---|
| 7,007,989 B2 | 3/2006 | Yoon |
| 7,055,886 B2 | 6/2006 | Guiles |
| 7,066,508 B1 | 6/2006 | Baccouche et al. |
| 7,073,831 B2 | 7/2006 | Evans |
| 7,163,241 B2 | 1/2007 | Liu et al. |
| 7,182,393 B2 | 2/2007 | Guiles |
| 7,210,717 B1 | 5/2007 | Baccouche et al. |
| 2002/0149214 A1 | 10/2002 | Evans |
| 2004/0135384 A1 | 7/2004 | Pritchard et al. |
| 2004/0201255 A1 | 10/2004 | Jonsson |
| 2005/0285414 A1 | 12/2005 | Liu et al. |
| 2006/0001277 A1 | 1/2006 | Mellis et al. |
| 2006/0028032 A1 | 2/2006 | Henseleit |
| 2006/0071485 A1 | 4/2006 | Karlander |

* cited by examiner

COMPARISON WITH STANDARD B-SECTION AND HYBRID B-SECTIONS
EQUAL WALL THICKNESS : 1.2mm

| SECTION | Iz | Zz | MASS (kg) |
|---|---|---|---|
| "STANDARD" B-SECTION (BEAM 70-FLAT FORCE) | 382088 | 13165.9 | 6.044 |
| SECTION 5 (BEAM 20) | 302675 | 11201 | 5.68 |
| SECTION 6 (BEAM 20A) | 312122 | 11425.8 | 5.725 |

FIG. 14 though there is some inventive differences ("deltas"). Notably, the present invention is not limited to only the particularly-illustrated shape shown in the drawings, but instead is believed to be applicable to a wide range of B-shape cross-sectional shapes.

B-SHAPED BEAM WITH RADIUSED FACE BUT RECESSED CENTER

CROSS REFERENCE TO RELATED APPLICATION

This claims benefit of a provisional application under 35 U.S.C. § 119(e), Ser. No. 60/941,129, filed May 31, 2007, entitled B-SHAPED BEAM WITH RADIUSED FACE BUT RECESSED CENTER.

BACKGROUND

The present invention relates to vehicle bumper systems, and more specifically relates to B-shaped reinforcement beams with a face wall having a particular radiused shape over its tubular sections and a recess in the center web between the tubular sections.

It is known to manufacture B-shaped reinforcement beams for use in vehicle bumper systems. For example, see Sturrus U.S. Pat. No. 5,395,036, issued Mar. 7, 1995. However, "standard" B-section beams (historically) have a relatively flat front wall (often called its "face") with tightly radiused corners at their upper and lower edges. The "standard" B-section beams (as exemplified by Sturrus '036) further include a relatively flat center web positioned at a location vertically aligned with upper and lower portions of the front wall. However, it has been discovered that a "standard B-section beam" has a tendency to prematurely buckle during an impact, due in part to high stress concentration in the tight radius areas and due in part to buckle-type failure occurring in the planar front wall. This buckling results in premature load drop due to premature failure of the entire B-beam, and in turn may result in a need for longer strokes for the bumper system and higher "back of beam" (BOB) clearance requirements.

SUMMARY OF THE PRESENT INVENTION

In one aspect of the present invention, a bumper reinforcement beam for vehicle bumper systems includes a B-shaped reinforcement beam formed from a sheet into an elongated tubular beam of constant section. The tubular beam has a vertical cross section defining at least first and second tubes connected by a center web. The beam includes a front wall that extends across the top and bottom tubes and across the center web to define a channel therebetween. The first and second tubes each include a forwardmost point that when connected by a straight line defines a depth dimension (D1) to the center web of about 15-30 mm. The first and second tubes each include an outwardly-bent section of wall defining a radius (R1) formed about a horizontal axis that is between about 15-25 mm, the outwardly-bent section extending between the center web and the forwardmost point of the associated first and second tubes. Mounts are attached to ends of the beam for attachment to a vehicle frame.

In a narrower aspect, a preferred depth dimension of the channel is at least about 20 mm and a preferred channel adjacent radius of about 25 mm.

In still another aspect of the present invention, a bumper reinforcement beam for vehicle bumper systems includes a tubular reinforcement beam formed from sheet material into an elongated tubular beam of constant section, where the tubular beam has a vertical cross section defining at least one tube and a channel in its face. The beam includes a front wall that extends across the at least one tube and the channel. The channel has a depth dimension (D1) of at least about 15-30 mm, and the front wall has at least one portion defining a radius (R1) that is between about 15-25 mm, the front wall portion extending between the channel and the forwardmost point.

In another aspect of the present invention, a method includes steps of providing a bumper reinforcement beam for vehicle bumper systems. One of the steps includes providing a B-shaped reinforcement beam formed from a sheet into an elongated tubular beam of constant section, the tubular beam having a vertical cross section defining at least first and second tubes connected by a center web and including a front wall that extends across the top and bottom tubes and the center web to define a channel therebetween; the first and second tubes each including a forwardmost point that when connected by a straight line defines a depth dimension (D1) to the center web of about 15-30 mm, the first and second tubes each including an outwardly-bent section of wall defining a radius (R1) formed about a horizontal axis that is between about 15-25 mm, the outwardly-bent section extending between the center web and the forwardmost point of the associated first and second tubes. Another step includes providing mounts attached to ends of the beam for attachment to a vehicle frame. Still another step includes attaching the reinforcement beam to a vehicle frame by attaching the mounts to the vehicle frame, with the front wall facing forwardly.

These and other aspects, objects, and features of the present invention will be understood and appreciated by those skilled in the art upon studying the following specification, claims, and appended drawings.

DETAILED DESCRIPTION OF PREFERRED EMBODIMENTS

Figures 1, 1A:
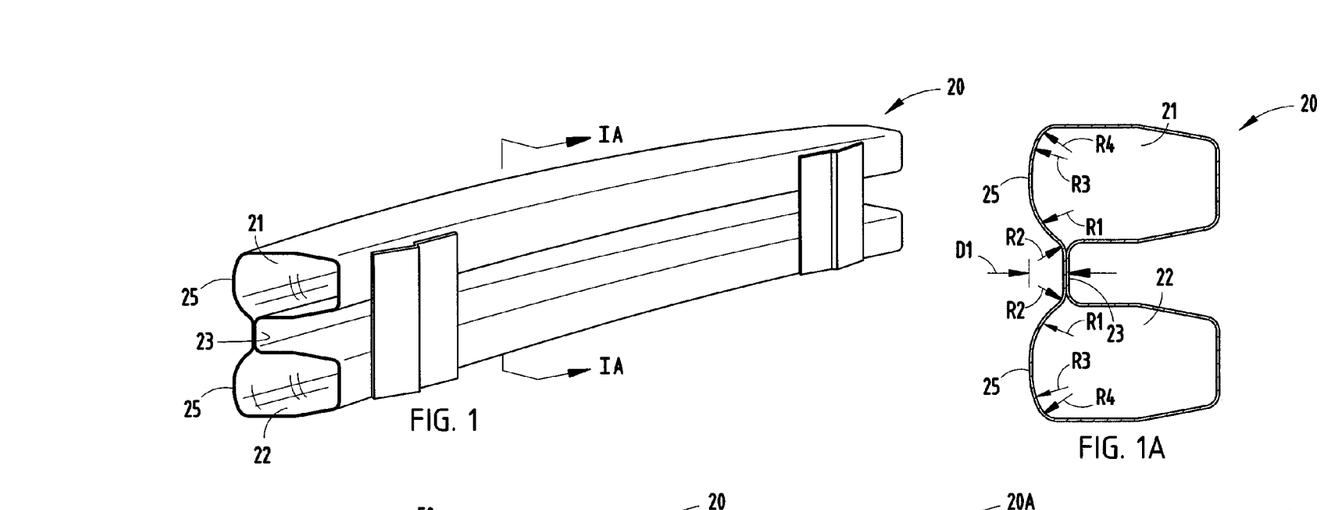
FIG. 1 is a perspective view of a B-shaped reinforcement beam embodying the present invention, the B beam being longitudinally swept to match a curvature of a vehicle front.
FIG. 1A is a vertical section taken along line 1A-1A in FIG. 1.

A B-shaped reinforcement beam 20 (FIGS. 1 and 1A) embodying the present invention has a face (i.e., front surface) with a particular non-linear radiused shape forming a front of each of the top and bottom tubes 21 and 22 in the beam, and a particular front depth of its center web 23. In the illustrated beam 20 (FIG. 1), the top and bottom portions are mirror images of each other top-to-bottom about a horizontal plane through the center web, such that the top and bottom tubes each include a sequence of radii R2, R1, R3, R4 defined in the face (starting from the channel out), and a depth dimension D1 defined by the center web 23 to highest point of the front wall, as discussed below.

More specifically, the illustrated B-shaped beam 20 is roll formed from a single sheet into a B shaped cross section, and then welded along the center web 23 to permanently define the top tube 21 and the bottom tube 22, the tubes 21, 22 being connected by the center web 23. When mounted to a vehicle, the B-shaped beam 20 is oriented so that the center web 23 forms a significant channel or recess of depth D1 in the face. The face of the B-shaped beam 20 is "bulged forward" on each of the upper and lower tubes 21 and 22, and includes specific radii chosen to cause improved energy absorption (i.e., optimal "crush") upon impact, as discussed below. Our testing shows that the illustrated shape of B beam 20 (and 20A) better distributes impact loads, provides a longer crush stroke, and provides better and more consistent energy absorption over traditional B-shaped beams with flat front walls. In particular, testing showed that impact/bending strength of B-shaped bumper reinforcement beams is significantly improved where a front wall has radius R1 of 15-25 mm (or preferably about 25 mm) located adjacent the channel and a channel depth of 10-25 mm (or preferably about 20 mm) and having generous radii at R1, R3, R4 (i.e., above and below the radii R1). The resulting properties of the present inventive beam (20 and 20A) allow the beam to be designed to be lighter in weight while maintaining a given impact strength . . . or alternatively to be designed with equal weight but with improved impact strength and energy-absorbing capability.

B beam 20 (FIG. 1), starting from the center web 23 and moving downward, the face includes a forwardly-curved tight radius R2 and then a reversely-curved outwardly-bent section of wall 25 defining a larger radius R1 up to a forwardmost point 25 on the face. The radius R1 and R2 combine to form an S shape extending from the center web 23 onto the forewardmost point 25 on the lower tube of the face. Then the face continues downward and includes a rearwardly-formed first radius R3 and then a rearwardly-formed tighter radius R4 that combines with radius R3 to form a C shape that transitions onto the lower horizontal wall of the beam. The result is a forwardly "bulged" and multiply-radiused front wall of the tube 22. A distance from the forwardmost point 25 to a deepest part of the center web 23 (i.e., the "significant channel" or recess) defines a dimension D1. A shape of the upper half of the face is preferably a mirror image of the lower portion of the face, including radii R2, R1, R3, and R4 as one moves from the center web 23 up to a top wall of the top tube 21.

Figure 3:
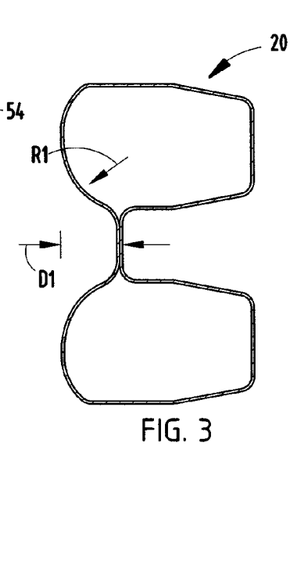
FIGS. 3-4 are cross sections of B-shaped reinforcement beams embodying the present invention with more generous radii at top and bottom edges of its face, deeper recesses at the center webs; and more generous radii on the face just above and below the center web.
Figures 4, 10:
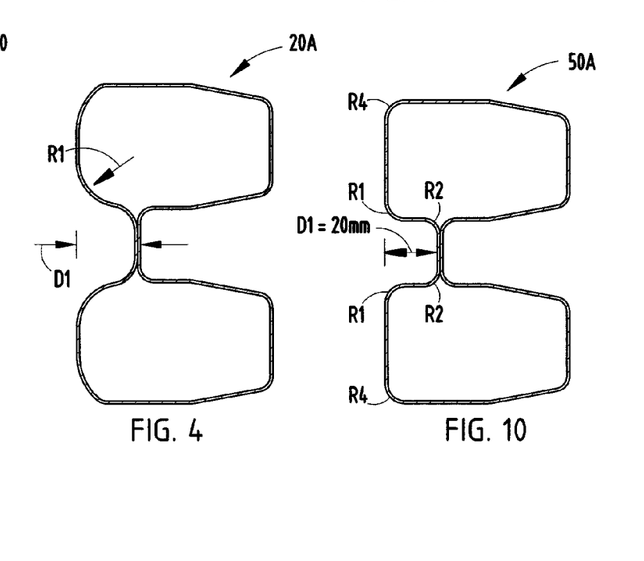
FIG. 10 is a vertical cross section through a B-shaped reinforcement beam, similar to FIG. 4 but where the cross section shows relatively tight radii at top, bottom, and center locations and having a semi-deep recess at the center web.

Our testing shows that the radius R1 and dimension D1 are important dimensions, and that as a result of selecting critical values for these dimensions, the B beams (see for example the beam 20 called B section 5 and the beam 20A called "B section 6" in FIGS. 3-4) include a surprisingly and unexpectedly improved set of impact properties. In particular, the present innovative B beams achieve significantly, surprisingly, and unexpectedly improved properties in testing when the radius R1 is about 15 mm to 25 mm, and the dimension D1 is about 15 mm to 20 mm. In particular, testing shows that a B beam 20 is a most preferred shape (i.e., where R1 is about 25 mm, D1 about 20 mm).

Figure 15:
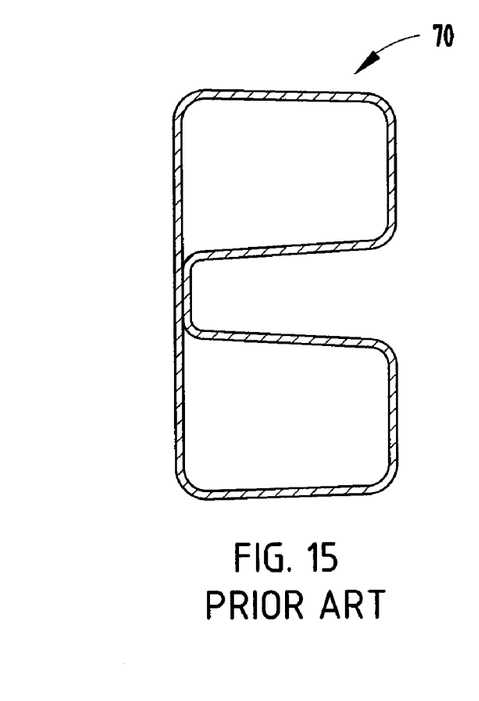
FIG. 15 is a cross section of a B beam in prior art.

B beam 50 (FIG. 2) shows a B beam with channel dept D1 of 5.0 mm at its center web 52. The front wall is relatively flat over the two tubes 53 and 54. Also, the top and bottom corners C1 and C2 are relatively sharp, such as defining radii of about 5 mm. This B beam 50 was tested against the inventive B beams 20 and 20A in an effort to determine a significance of a depth of the channel at center web (52). The beam 50 is not prior art . . . but is relatively close to typical prior art B beams with flat face walls (see FIG. 15 and the B beam disclosed in Sturrus U.S. Pat. No. 4,545,506). The beam 50 also generates data generally similar to prior art B beams with front walls that are close to flat and/or that have tight-radiused top and bottom corners.

Figure 5:
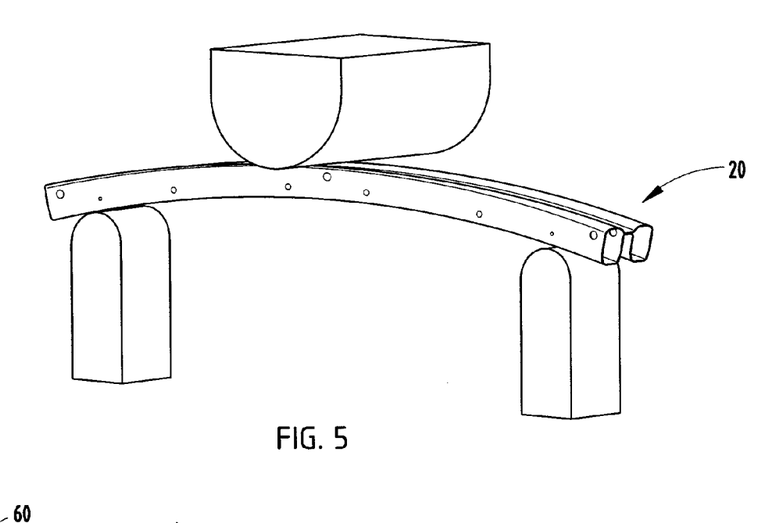
FIG. 5 is a schematic perspective view showing a static FEA 3-point bending test.
Figure 6:
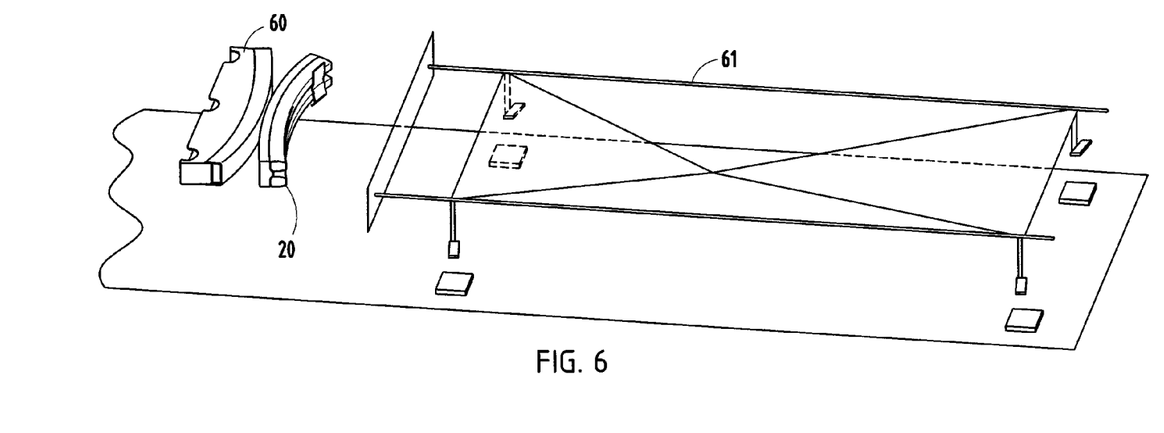
FIG. 6 is a schematic perspective view showing a dynamic barrier impact test, which can be performed using a stationary barrier and moving vehicle-simulating sled, or can be performed using a pendulum and a stationary vehicle-simulating sled; and also can be used to perform a flat barrier impact test or a bumper-to-bumper test.
Figure 7:
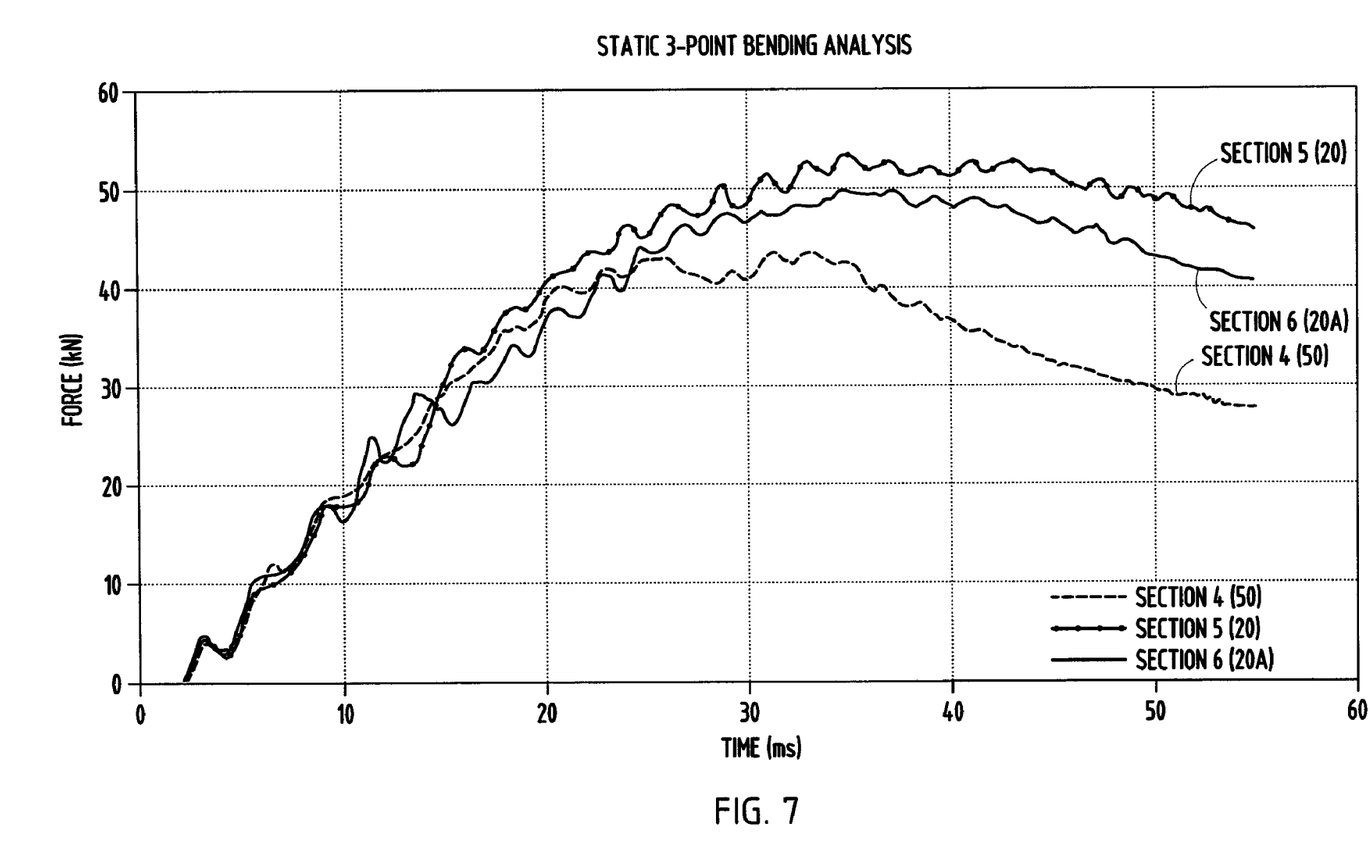
FIGS. 7-9 are graphs showing test results of a 3-point bending test, a 5 mph flat barrier impact test, and a 10 km/h Insurance Institute of Highway Safety (IIHS) barrier impact test conducted on the beams of FIGS. 2-4.
Figure 8:
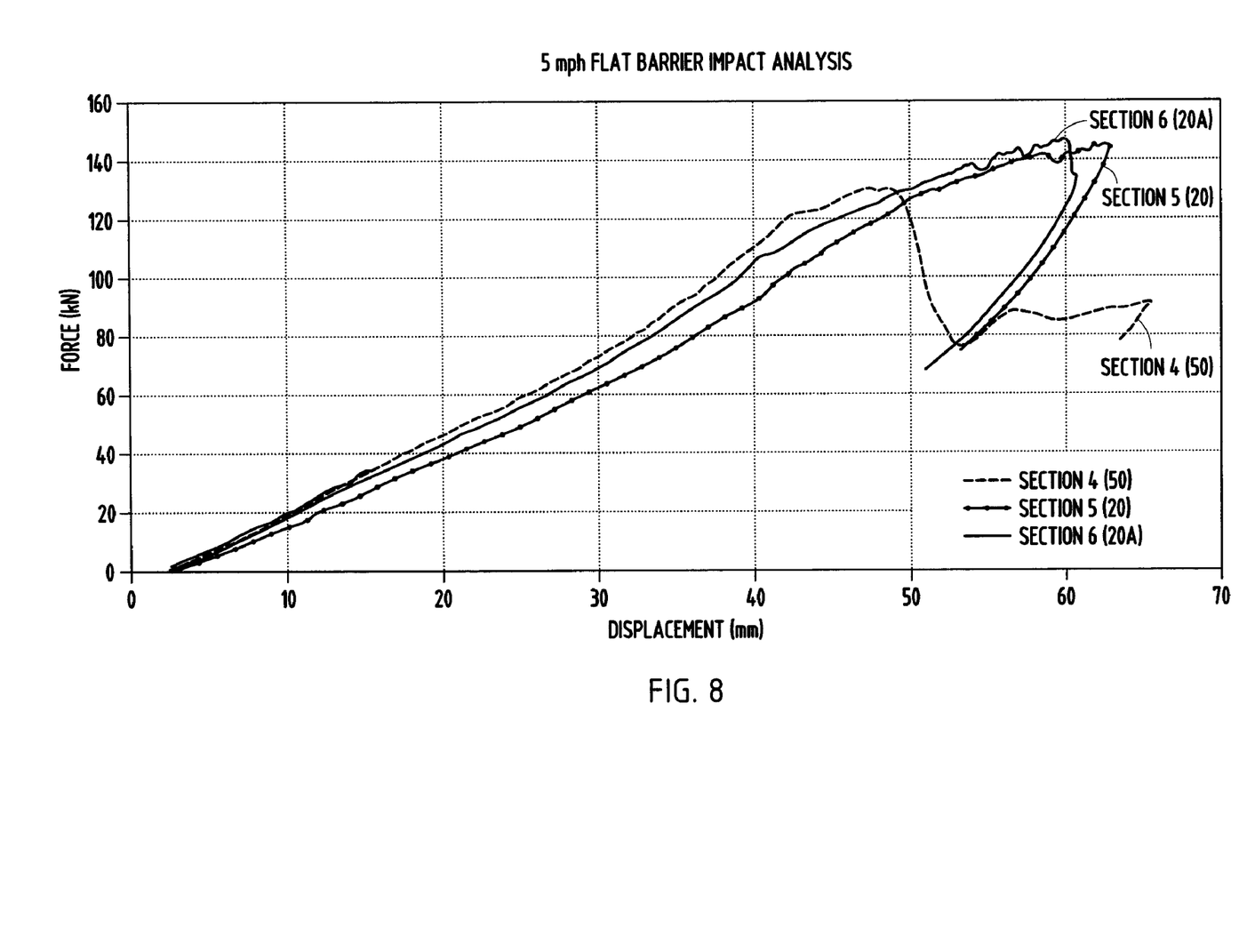
Figure 9:
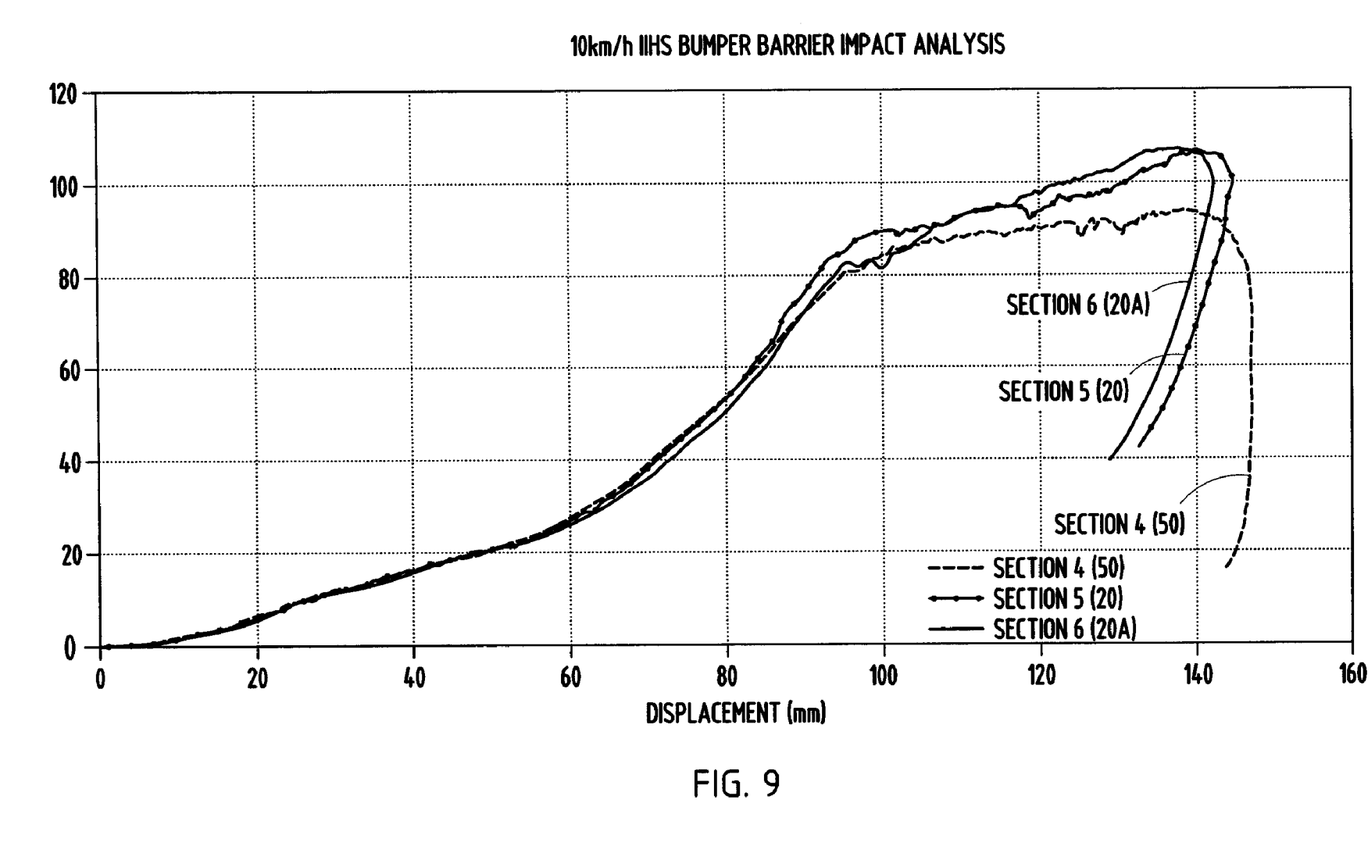

FIG. 5 shows a test setup for a 3-point bending analysis for obtaining data. Data from a test of beams 20, 20A and 50 on the test set up of FIG. 5 are shown in FIG. 7. FIG. 6 is a schematic perspective view showing a dynamic barrier impact test arrangement using a sled 61 for obtaining data. At a left side of FIG. 6 is a bumper-simulating barrier 60. Data from tests of beams 20, 20A and 50 on the test set up of FIG. 6 are shown in FIGS. 8-9. One dynamic barrier impact test is a 5 mph flat barrier impact test (see FIG. 8) where the bumper system with beam 20 carried by a wheeled sled 61 is impacted against a flat surface (or where a wheeled sled 61 carrying the bumper 20 is impacted by a pendulum). Another dynamic barrier impact test is an impact test set up according to an Insurance Institute of Highway Safety (IIHS) bumper barrier impact test requirement where the bumper system with beam 20 is impacted by a bumper-simulating barrier 60 at 10 km/h. (See FIG. 9.) There are various standardized ways of conducting these tests, and a person of ordinary skill understands how to conduct these tests and will understand the significance of the graphed results of these tests.

The B beams 20, 20A, and 50 (each having cross sections similar to those shown in FIGS. 3, 4, and 2, respectively) were used in the present testing of FIGS. 7-9. Each of the beams 20, 20A and 50 included a 115 mm by 70 mm B section (each tubular section being about 70 mm fore/aft depth, 40 mm max vertical height, and spaced apart about 25 mm) with swept longitudinal shape of 2600 mm sweep radius (i.e., aerodynamically curved to match a curved front of vehicle) and 1400 mm length. The material in each was M190 ultra high strength sheet steel (i.e., a tensile strength of about 190 KSI) and had a wall thickness of about 1.2 mm. The energy absorber placed on a front of the beams was a constant 40 mm thickness EPP material at 4.2 pcf. The setup included a 900 mm rail span on the vehicle. For the dynamic testing, a weight of the moving impact mass was 1800 kg, and the analysis was performed at 100% kinetic energy, both for the 5 mph flat barrier test, and for the 10 km/h-IIHS barrier test.

Based on the data, the present optimal B-shaped reinforcement beam, represented by beam 20 (section 5, FIG. 3) and by beam 20A (section 6, FIG. 4) has a "forwardly bulged" or curvilinear portion in its face extending from each tube section toward the center web, each forwardly bulged portion defining a front-point-to-center-web radius R1 of about 15-30 mm (and more preferably about 15-25 mm, and most preferably about 25 mm), and having a front-point-to-center-web depth dimension D1 of about 12.5 to 25 mm (and more preferably about 15-22 mm, and most preferably about 20 mm).

Figure 2:
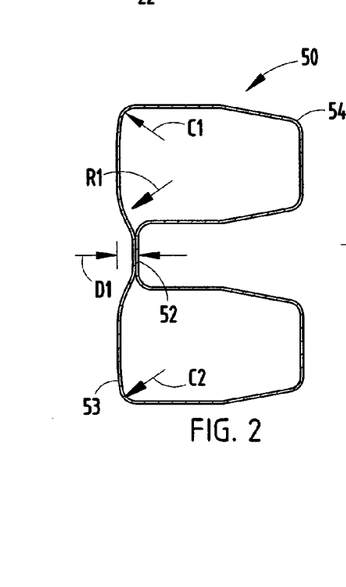
FIG. 2 is a cross section of a B-shaped reinforcement beam with tight radii at top and bottom edges of its face, and a relatively shallow recessed center web.

FIGS. 7-9 are graphs showing test results of three tests conducted on the beams of FIGS. 2-4: a 3-point bending test, a flat barrier impact test, and an IIHS barrier impact test. As can be seen, the beam 20 identified as "section 5" was an optimally performing beam, and the beam 20A identified as "section 6" is a very close second optimally performing beam. Specifically, FIG. 7 shows that B beams 20 and 20A have a significantly longer bending stroke without premature drop off in strength at loads over 45 kN, while the comparable B beam 50 begins noticeable kinking and begins catastrophic failure at under 45 kN. Also, a strength of the beam 50 begins to drop off much sooner than the beams 20 and 20A (i.e., at about 35 mm in the test). In the 5 mph flat barrier test (FIG. 8), the impact of the beams 20 and 20A were also significant improvements over the beam 50 at dynamic impact loads of 130 kN and at displacements of over 50 mm. In the 10 km/h IIHS Bumper Barrier Test, the impact strength of the beams 20 and 20A were significantly improved over the beam 50 at dynamic loads of over 90 kN. Notably, our testing shows that as the channel depth D1 is increased, the beam will flex and carry the impact load further (i.e., the beam bends further) before catastrophic failure. Notably, there is some loss in initial beam stiffness as D1 is increased due to displacement of material into the beam and resulting in lower moment of inertia value. (For example, see FIG. 14 below.) Similarly, our testing shows that as the radius R1 is increased, the beam will flex and carry the impact load further (i.e., the beam bends further) before catastrophic failure. Again there is some loss in initial beam stiffness as R1 is increased due to displacement of material into the beam and resulting in lower moment of inertia value. The fact that a beam has greater impact strength when modified in a way that reduces its moment of inertia $I_z$ and bending strength $Z_z$ is surprising since traditional thinking is that stiffer beams provide greater impact strength. A reason for this improvement in impact strength of beams 20 and 20A is believed to be because the beam 20 (section 5) and beam 20A (section 6) have a "softer impact" and more "breathing effect" and hence they distribute impact load better, as discussed below.

Figure 14:
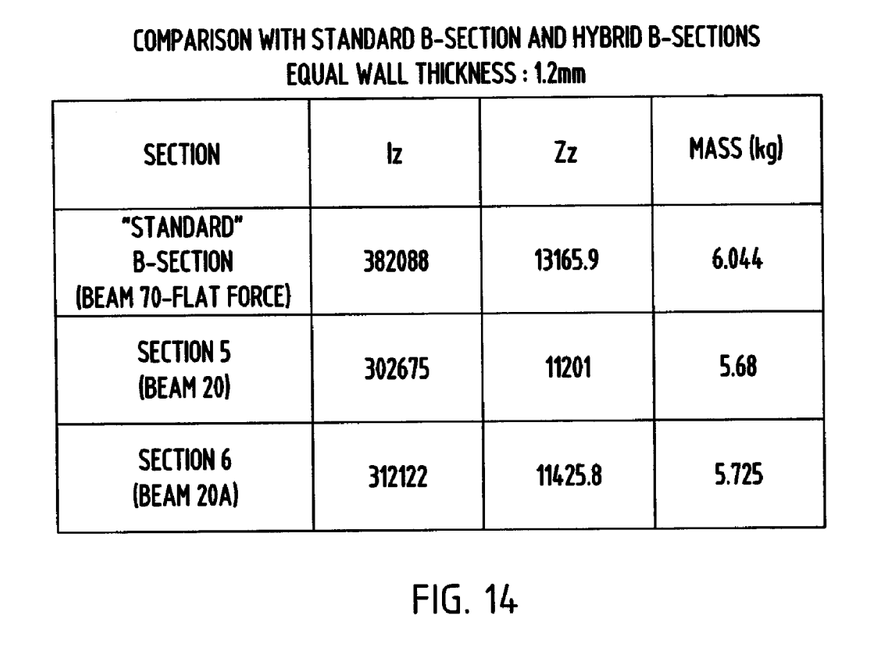
FIG. 14 is a chart comparing properties of various B-shaped reinforcement beams.

It is counter-intuitive to reduce beam stiffness and to reduce the beams moment of inertia $I_z$ and bending strength $Z_z$ in order to yield a stronger beam impact strength . . . since intuitively higher beam stiffness "equals" more impact strength. The chart in FIG. 14 compares the B beams 20/20A having the shape of cross sections 5 and 6 against a "standard" B section beam with flat face (see FIG. 15 and also see the B beam in Sturrus U.S. Pat. No. 5,395,036). The B beams in FIG. 14 were each 1400 mm long (length measured along the front surface) and were made from sheet having a thickness of 1.2 mm. The beams' $I_z$ (moment of inertia) and $Z_z$ (bending moment) are known engineering values calculated by known formula. The data for the "standard" B section (beam 70—flat face) is intended to represent B sections with a flat face or near flat face (such as B beam 50, FIG. 2). Despite the standard B beam (with flat or near-flat face wall) having a theoretical moment of inertia ($I_z$) value of 382088, and a theoretical bending moment ($Z_z$) value of 13165.9 and a mass of 6.044 kg, all of which are significantly higher than the equivalent data for B beams 20 and 20A, the B beams 20 and 20A performed better (see FIGS. 7-9).

Figure 11:
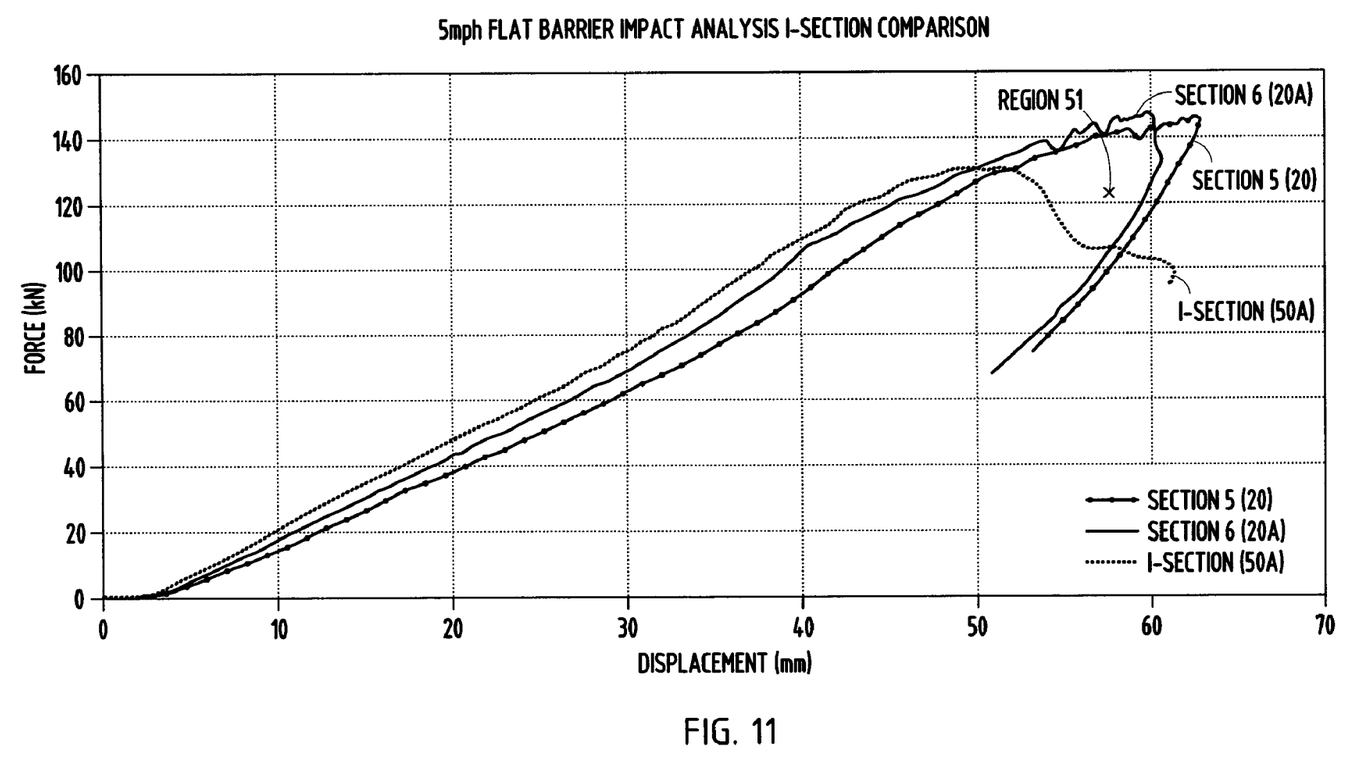
FIGS. 11-12 are graphs showing test results of a flat barrier impact test and a IIHS barrier impact test conducted on the beams of FIGS. 10 and 3-4.
Figure 12:
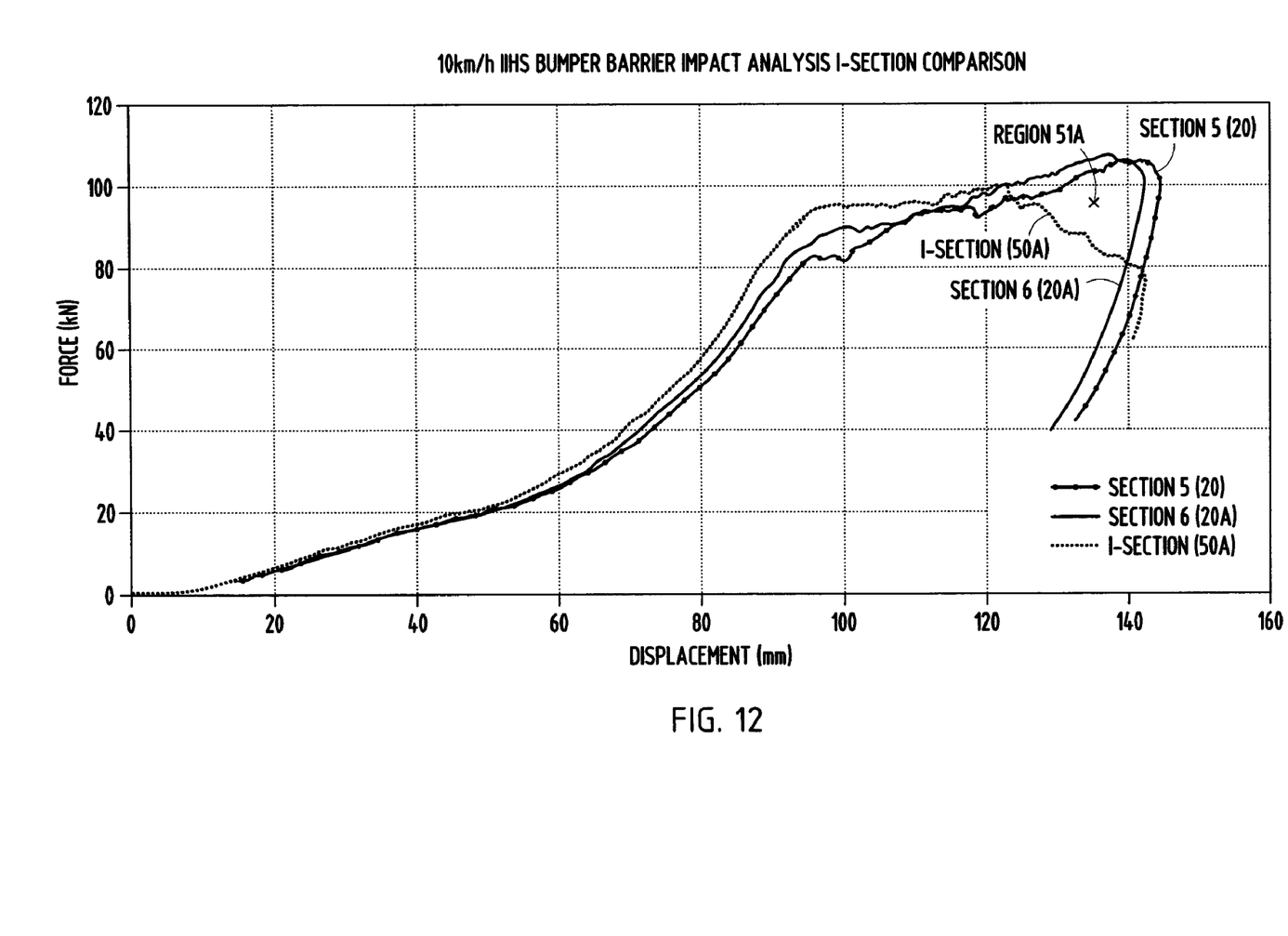

We wanted to further test a significance of the radii R1, R2, (R3) and R4. FIG. 10 shows a B section beam 50A with a significantly recessed center web (i.e., recessed from the front face to a distance D1 of 20 mm deep), but with relatively sharp upper and lower radii (i.e., about 5 mm radii) at top and bottom edges. In beam 50A, radii R3 are essentially eliminated to create a flat co-planar front surface, and the radii R1, R2 and R4 are made to be as small of radii as possible, such as about 5 mm. The resulting B beam 50A has reduced end-of-stroke impact strength, as shown in FIGS. 11-12 over the beam 20 (section 5) and the beam 20A (section 6) (see the region 51 in FIG. 11 and 51A in FIG. 12). This data shows that the radius R1 is particularly important, and that the radii R1-R4 are important in combination with each other as well as in combination with the channel. In other words, it is important that that the radii R1-R4 be greater than 5 mm, especially in the forward bulge of the front face just outside the channel, whether the bumper includes a significant channel depth dimension D1 or not.

Figure 13:
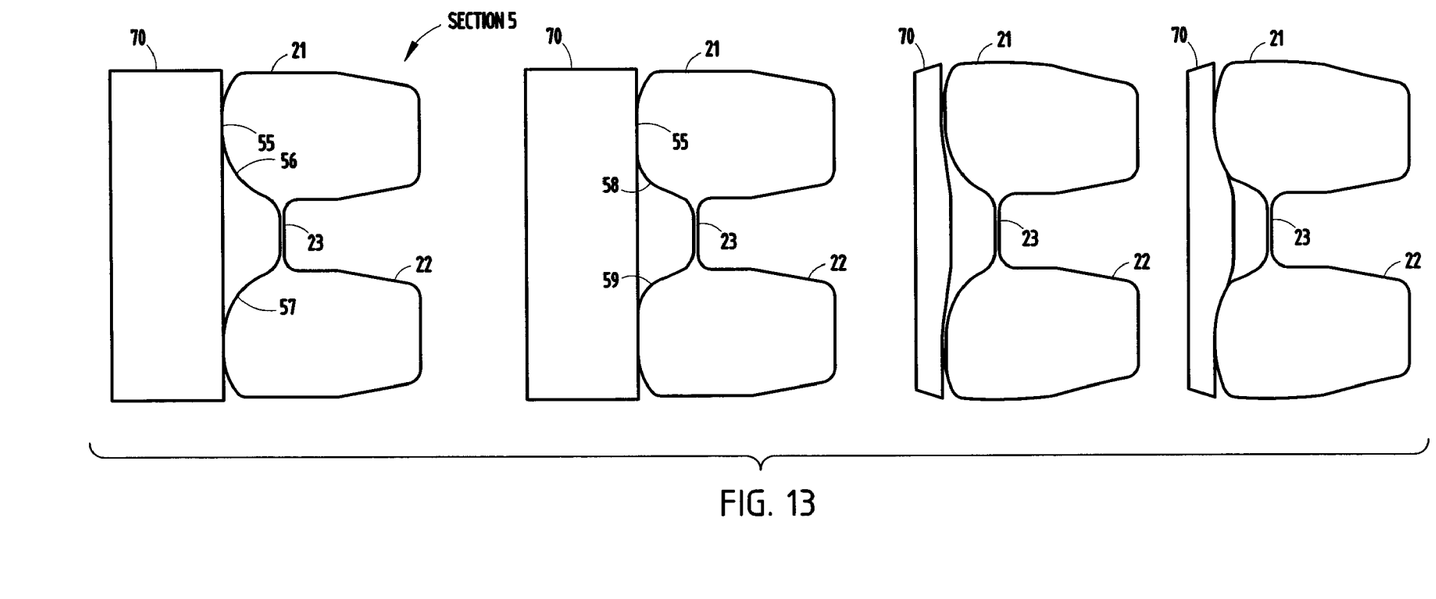
FIG. 13 is a schematic cross section view showing a crush sequence for the beam of FIG. 4, which is not totally unlike the crush sequence for the beam of FIG. 3.

FIG. 13 shows an exemplary crush sequence during an impact for a beam 20 ("section 5") with a polymeric energy absorber 70 on its face, and pictorially helps explain what is believed to happen during an impact. The impact against the beam 20 includes a first contact at its forwardmost point 55, and results in the material at location 56 and 57 dynamically flexing toward the "temporarily more flattened" shape shown by lines 58 and 59. The crush sequence for beam 20A with section 6 (FIG. 4) is somewhat similar, and can be shown schematically in a similar manner. The improvement of beams 20/20A (i.e., the sections 5 and 6) is considered significant over a more traditional B beam 50 (and also see Sturrus U.S. Pat. No. 5,395,036), even if the traditional B beam has a shallow channel of about 1-5 mm in face.

To summarize, the present B-shaped reinforcement beam for vehicle bumper systems has a "forwardly bulged" or curvilinear portion in its face extending over each tube section, each forwardly bulged portion having a center-web-to-front-point recess radius R1 of about 15-30 mm (and more preferably about 15-25 mm, and most preferably about 25 mm), and having a center-web-to-front-point depth dimension D1 of about 12.5 to 30 mm (and more preferably about 15-25 mm, and most preferably about 20 mm). This condition provides a surprising and unexpected increase in beam functionality and desirable impact characteristics. Notably, through specific dimensions of the present invention B beam are given, the dimensions can be tailored for specific needs by selection of beam dimensions individual tube dimensions, spacing of tubes, sheet thickness material hardness, and in other ways as desired while still remaining within a scope of the present invention.

It is to be understood that variations and modifications can be made on the aforementioned structure without departing from the concepts of the present invention, and further it is to be understood that such concepts are intended to be covered by the following claims unless these claims by their language expressly state otherwise.

The embodiments of the invention in which an exclusive property or privilege is claimed are defined as follows:

1. A bumper reinforcement beam for vehicle bumper systems comprising:

a B-shaped reinforcement beam formed from a sheet into an elongated tubular beam of constant section, the tubular beam having a vertical cross section defining at least first and second tubes connected by a center web and including a front wall that extends across the first and second tubes and the center web to define a channel therebetween; the first and second tubes each including a forwardmost point that when connected by a straight line defines a depth dimension (D1) to the center web of about 15-30 mm, the front wall over each of the first and second tubes including an outwardly-bent section of wall defining a radius (R1) formed about a horizontal axis that is between about 15-25 mm, the outwardly-bent section extending between the center web and the forwardmost point of the associated first and second tubes and extending at least about half of the associated first and second tubes; and mounts attached to ends of the beam for attachment to a vehicle frame.

2. The beam defined in claim 1, wherein the depth dimension of the channel is about 20 mm.

3. The beam defined in claim 1, wherein the radius is about 25 mm.

4. A bumper reinforcement beam for vehicle bumper systems comprising:

a tubular reinforcement beam formed from sheet material into an elongated tubular beam of constant section, the tubular beam having a vertical cross section defining at least one tube and a channel in its face, and including a front wall that extends across the at least one tube and the channel; the channel having a depth dimension (D1) of about 15-30 mm, and the front wall having at least one portion defining a radius (R1) that is between about 15-25 mm, the front wall portion extending between the channel and defining a cross section with a single forwardmost point located generally in a center of the at least one tube.

5. The beam defined in claim 4, wherein the depth dimension is about 20 mm.

6. The beam defined in claim 4, wherein a portion of the face leading into the channel defines a radius that is about 25 mm.

7. The beam defined in claim 4, including mounts attached to ends of the beam for attachment to a vehicle frame.

8. A method comprising steps of:

providing a bumper reinforcement beam for vehicle bumper systems comprising:

forming a B-shaped reinforcement beam from a sheet into an elongated tubular beam of constant section, the tubular beam having a vertical cross section defining at least first and second tubes connected by a center web and including a front wall that extends across the top and bottom tubes and the center web to define a channel therebetween; the first and second tubes each including a forwardmost point that when connected by a straight line defines a depth dimension (D1) to the center web of about 15-30 mm, the first and second tubes each including an outwardly-bent section of wall defining a radius (R1) formed about a horizontal axis that is between about 15-25 mm, the outwardly-bent section extending between the center web and the forwardmost point of the associated first and second tubes;

providing mounts attached to ends of the beam for attachment to a vehicle frame; and attaching the reinforcement beam to a vehicle frame by attaching the mounts to the vehicle frame, with the front wall facing forwardly.

9. The beam defined in claim 1, wherein a cross section of the front wall over the top and bottom tubes does not include a planar section.

10. The beam defined in claim 4, wherein a cross section of the front wall over the top and bottom tubes does not includes a planar section.

11. The method defined in claim 8, wherein the step of forming a beam includes forming the front wall over the top and bottom tubes to have a cross section not having a planar portion.

12. The beam defined in claim 1, wherein at least 50% of the front wall over the top and bottom tubes is non-planar.

13. The beam defined in claim 4, wherein at least 50% of the front wall over the top and bottom tubes is non-planar.

14. The method defined in claim 8, wherein the step of forming a beam includes forming at least 50% of the front wall over the top and bottom tubes to be continuously curvilinear in cross sectional shape.

* * * * *